United States Patent [19]

Hino

[11] Patent Number: 4,704,647
[45] Date of Patent: Nov. 3, 1987

[54] MAGNETIC RECORDING AND REPRODUCING SYSTEM WITH A CLEANING MECHANISM

[75] Inventor: Hiromasa Hino, Tokyo, Japan

[73] Assignee: Fuji Photo Film Co., Ltd., Kanagawa, Japan

[21] Appl. No.: 664,015

[22] Filed: Oct. 23, 1984

[30] Foreign Application Priority Data

Oct. 24, 1983 [JP] Japan .............................. 58-197575

[51] Int. Cl.$^4$ .............................................. G11B 5/41
[52] U.S. Cl. .................................................. 360/128
[58] Field of Search .............................. 360/128, 137

[56] References Cited

U.S. PATENT DOCUMENTS 3,636,276  1/1972  Rose ..................................... 360/128
3,702,906  11/1972 Camras ................................. 360/128
3,964,104  6/1976  Herron et al. ....................... 360/128
4,257,079  3/1981  Yoshizawa ........................... 360/128
4,462,056  7/1984  Kara ..................................... 360/128

FOREIGN PATENT DOCUMENTS 52-75426   6/1977  Japan ................................... 360/128
56-58127   5/1981  Japan ................................... 360/128
58-108029  6/1983  Japan ................................... 360/128

Primary Examiner—John H. Wolff
Assistant Examiner—Matthew J. Bussan

[57] ABSTRACT

A magnetic recording and reproducing system is provided with a cleaning mechanism wherein a cleaning pad contacts a rotary magnetic head to clean said magnetic head during inertial rotation of said magnetic head.

6 Claims, 6 Drawing Figures

MAGNETIC RECORDING AND REPRODUCING SYSTEM WITH A CLEANING MECHANISM

BACKGROUND OF THE INVENTION

This invention relates to a magnetic recording and reproducing system, specifically equipped with a cleaning mechanism to prevent its rotary magnetic head from clogging. For example, in household VTR units, a so-called helical scanning method is generally used wherein magnetic tape is helically wound approximately 180 to 220 degrees around a cylinder having a rotary magnetic head. Such units include those for recording and reproduction of magnetic tape and those for only recording such as an integrated type of VTR camera. In this specification, these units are comprehensively called as magnetic recording and reproducing systems. In such magnetic recording and reproducing systems using a rotary magnetic head, most deterioration of recorded or reproduced image or misrecording can be attributed to a clogged rotary magnetic head. Clogging of the rotary magnetic head is caused by dust in the atmosphere or magnetic powder produced while the magnetic head scans recording media. It is therefore necessary to frequently clean the magnetic head in order to assure good recording and reproduction.

Heretofore, the rotary magnetic head has been cleaned using a cleaning cassette which is a cleaning tape installed in a cassette or by wiping with a chamois leather damped with a cleaning liquid for example. The former method uses a tape with abrasive to polish the head and results in accelerated wearing of the head. In the latter method the VTR case is removed and the rotary magnetic head is exposed to clean it, requiring time and some skillness, frequent cleaning being difficult.

While it can be considered that a head cleaning mechanism to continually clean the rotary magnetic head is incorporated in the magnetic recording and reproducing system, it is impossible to use the method because cleaning the head during recording and/or reproduction will adversely affect the servo mechanism of the system and generate noise signals of 30Hz. Furthermore, if pressure is applied to the cleaning pad while the cylinder motor is rotating, the magnetic head may be damaged by the pressure of the pad.

SUMMARY OF INVENTION

The present invention comprises a magnetic recording and reproducing system incorporating a cleaning mechanism to frequently clean the rotary magnetic head of said magnetic recording and reproducing system without polishing or exposing said rotary magnetic head, wherein a cleaning pad is pressed against said magnetic head, synchronizing with the inertial rotation period of said rotary magnetic head, thereby eliminating adverse effects on the servo mechanism and, even if for any reason an excessive pressure is applied by said cleaning pad to said magnetic head, the cylinder will immediately stop, preventing said magnetic head from being damaged.

DETAILED DESCRIPTION OF INVENTION

Figure 1:
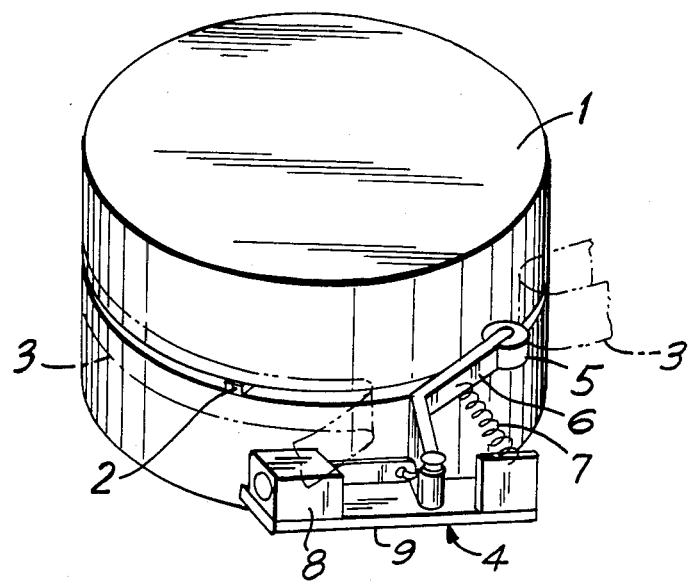
FIG. 1 is an oblique view showing an example of the present invention.

FIG. 1 is an oblique view showing an example of the magnetic recording and reproducing system of the present invention. Item 1 is the cylinder, of which either one of the upper or lower pieces rotates at 30 revolutions per second and the other is fixed. Item 2 is the magnetic head which is attached to said rotating cylinder and rotates integrally with said rotating cylinder, wherein said magnetic head projects 30 to 60 micrometers from the peripheral surface of said cylinder. Item 3 is magnetic tape which is helically wound approximately 180 to 220 degrees around cylinder 1 and runs at a constant speed. Item 4 is a cleaning mechanism provided in a position where magnetic tape 3 does not wind around cylinder 1 and magnetic head 2 rotating with cylinder 1 is exposed in the loading condition and does not contact with magnetic tape 3.

Said cleaning mechanism comprises pad 5 which is pressed against magnetic head 2 to clean it, lever 6 to hold pad 5, spring 7 to separate lever 6 from cylinder 1 so that pad 5 does not come in contact with magnetic head 3, plunger 8 to turn lever 6 to the side of cylinder 1 within the inertial rotation period of magnetic head 2 while magnetic head 2 rotates by inertia after it is driven as described hereinafter, and base plate 9 to support these mechanisms. With plunger 8 not actuated, lever 6 is separated from cylinder 1 by the force of spring 7 and pad 5 does not come in contact with magnetic head 2. When plunger 8 is actuated, it presses lever 6 against the force of spring 7 to cause pad 5 to contact the rotating magnetic head 2.

Pad 5 is made of a material which does not polish or grind magnetic head 2 and is able to clean magnetic head 2 sufficiently. Recommendable materials include close-textured and nap-free fabrics that can sufficiently absorb powder, such as chamois leather, textiles of long fibers, or high quality Japanese paper. If necessary, the head cleaning material may be damped with a head cleaning liquid.

Figure 2:
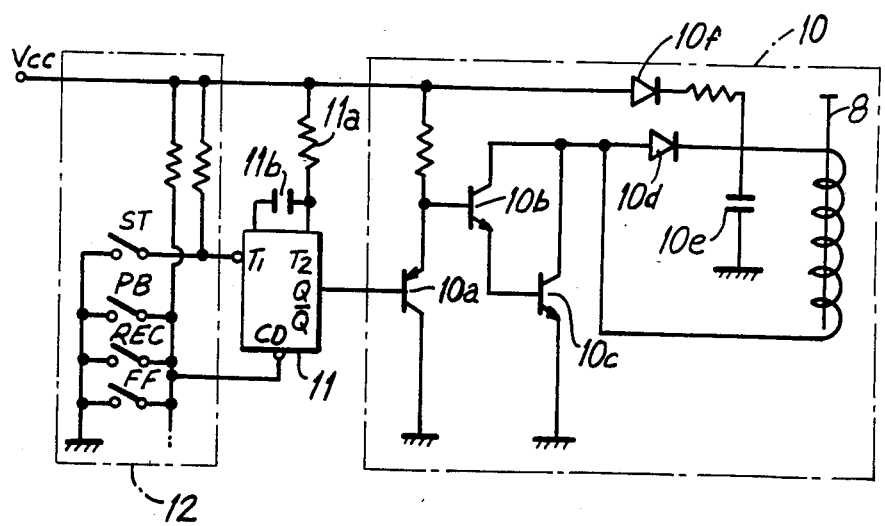
FIG. 2 is a circuit diagram showing an example of the circuit used in the present invention, FIG. 3 (a) and (b) are schematics showing parts of other examples of the present invention.

FIG. 2 shows an example of the operating circuit of plunger 8 shown in FIG. 1 to actuate said plunger within the inertial rotation period of magnetic head 2 to bring pad 5 in contact with magnetic head 2 within said period for cleaning said magnetic head. FIG. 2 shows an example wherein said magnetic head is cleaned only for a specified time after the stop button of said magnetic recording and reproducing system is operated.

In FIG. 2 the circuit used in the present invention comprises plunger drive unit 10, monostable multivibrator 11 and switch unit 12. Plunger drive unit 10 contains an amplifier unit comprising transistor 10a and Darlington-connected transistors 10b and 10c, the plunger 8 coil which is connected across said amplifier unit directly or via diode 10d, ground capacitor 10e connected to an end of said coil (or, if diode 10d is used, between said end of said coil and diode 10d), and power supply Vcc via diode 10f. When transistors 10a, 10b and 10c conduct, ground capacitor 10e and reference power supply Vcc energize said coil to actuate plunger 8. Monostable multivibrator 11 of which the time constant is determined by resistor 11a and capacitor 11b is connected to the preceding stage of plunger drve unit 10. Switch ST, which is interlocked with the stop button of said magnetic recording and reproducing system, and switch unit 12 containing switches PB, REC, FF and REW interlocked with other record(REC), fast feed(FF) and rewind(REW) buttons are connected to the preceding stage of monostable multivibrator 11. Switch ST of switch unit 12 is connected to terminal T1 of monostable multivibrator 11 and other switches PB, REC and FF are connected to reset terminal CD. When switch ST is turned on, a high-level signal (hereinafter called "H") is outputted from terminal Q of monostable multivibrator 11 which causes transistor to be conductive to actuate plunger 8 for a specified time. If another switch, PB for example, is turned on while H signal is being outputted from terminal Q of monostable multivibrator 11, terminal Q will be immediately reset to a low level (hereinafter called "L") which makes transistor 10a non-conductive to stop the operation of plunger 8.

As a result, when the stop button of said magnetic recording and reproducing system is pressed and switch ST is closed, plunger 8 operates to bring pad 5 in contact with magnetic head 2 to clean said magnetic head during the inertial rotation of the magnetic head as shown in FIG. 1.

The inertial rotation time of said magnetic head is approximately 8 to some 10 seconds, depending on tape loading condition, from turning on the stop button until said magnetic head stops rotating. The rotation speed of said magnetic head immediately after the stop button is pressed can be considered approximately same as that in operation, approximately 30 revolutions per second. Therefore, the period of time said pad is in contact with said magnetic head can be freely selected within the period from turning on the stop button until said magnetic head stops, and a contact period of several seconds can be obtained depending on the pressure of pad against said magnetic head, providing sufficient cleaning effect with a simple mechanism.

If pad 5 is for example 1 mm thick and of a material having a sufficient flexibility, the projection of said magnetic head from cylinder 1 will be 30 to 60 micrometers. As mentioned above, the pressure of pad 5 against magnetic head 2 is not so critical.

Figure 3A:
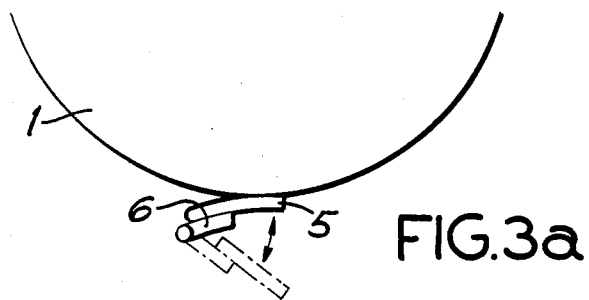
Figure 3B:
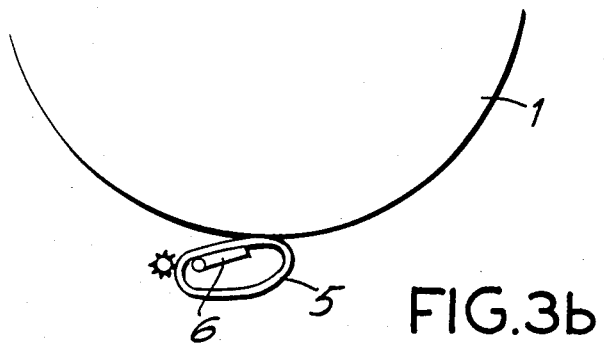

FIG. 3 (a) and (b) show other examples of the cleaning mechanism used in the present invention. FIG. 3 (a) shows an example wherein plate-shaped pad 5 is formed on lever 6, and FIG. 3 (b) shows an example wherein pad 5 is formed as an endless body and is turned every specified time interval to allow the contact surface to be changed.

Pad 5 described above can be damped with a cleaning liquid as needed, and of course a supply mechanism for the cleaning liquid can be provided near pad 5. It will be necessary to replace pad 5 if it is worn. This replacement will be easy if a door for pad replacement is provided in a position near cleaning mechanism 4 on the case of said magnetic recording and reproducing system.

Figure 4:
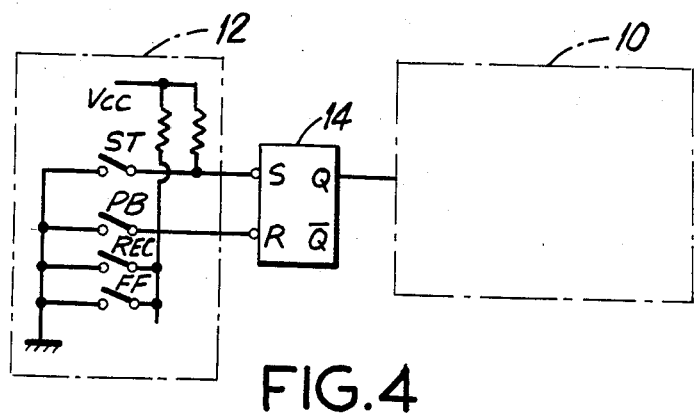
FIG. 4 is a circuit diagram showing other circuits used in the present invention.

FIG. 4 shows another example of a circuit used in the present invention, wherein the same numbers are used for the same parts as in FIG. 2 for simplicity. The circuit shown in FIG. 4 uses R-S flip-flop 14 in place of monostable multivibrator 11 in FIG. 2. R-S flip-flop 14 is a bistable circuit, and its set or reset status is kept unchanged, while monostable multivibrator 11 automatically returns to reset status after a specified time. Switch ST is connected to set terminal S, and switches PB, REC and FF are connected to reset terminal R. In this example, therefore, when switch ST of switch unit 12 is turned on, terminal Q goes H to actuate the plunger, and the operation of the plunger will be stopped by turning on another switch, for example switch PB.

The above examples relate to cleaning the magnetic head wherein with magnetic tape 3 loaded on cylinder 1 the magnetic head is cleaned during inertial rotation of magnetic head 2 after the stop button is pressed. However, cleaning methods for the magnetic head are not limited to the above. The magnetic head can be cleaned during inertial rotation of the magnetic head either in the tape-loaded or unloaded condition.

For example, in addition to above described ST, PB, REC, FF and REW buttons, a new cleaning button can be provided for reverse rotation of the magnetic head, whereby the pad is pressed against the magnetic head during the time the magnetic head rotates in reverse a specified time after said cleaning button is pressed. In this example, the drive circuit for the drive motor connected to said cleaning button can be conveniently provided with a timer to stop driving after a specified time so the magnetic head automatically enters into the inertial rotation. A monostable multivibrator can be advantageously used for said timer.

Figure 5:
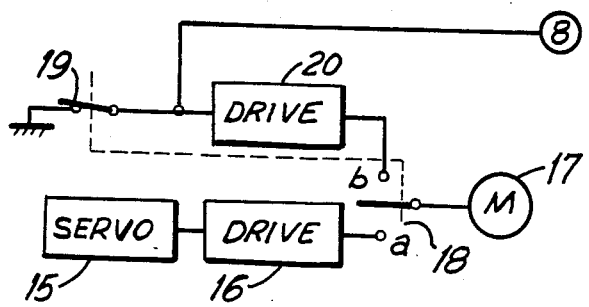
FIG. 5 is a simplified circuit diagram showing other examples of the present invention.

FIG. 5 shows an example of a circuit that can rotate the drive motor in reverse when the said cleaning button is pressed. The magnetic head is connected to terminal "a" of switch 18 so that the magnetic head always rotates forward through servo circuit 15 and drive circuit 16. When cleaning switch 19 is turned on, switch 18 linked with switch 19 is connected to terminal "b" of the drive circuit for reverse rotation of the drive motor, and drive motor 17 and in turn the magnetic head rotate in reverse. If, after a specified time, switch 18 is disconnected and plunger 8 is actuated, the magnetic head can be cleaned during reverse inertial rotation of the magnetic head. The position of the pad in this example is opposite that in FIG. 1 and FIG. 3 (a). Thus, cleaning the magnetic head during reverse inertial rotation of the magnetic head, result in improved cleaning as compared with the case of forward rotation.

In the above description, said cleaning mechanism is located in the non-wound area of magnetic tape on the cylinder where the magnetic head rotating with the loaded cylinder is exposed. This example has the advantage that said cleaning mechanism will not disturb loading or unloading of magnetic tape on the cylinder. Said cleaning mechanism may be located at any position if a mechanism is provided to withdraw said cleaning mechanism to a position out of the tape path during loading or unloading of magnetic tape.

As described in detail above, the cleaning mechanism of the present invention provides frequent cleaning of the magnetic head by the pad, not only preventing said magnetic head from being clogged, deterioration in image quality and misrecording, but also eliminating use of cleaning tape which grinds the magnetic head and reduces life of the magnetic head.

I claim my invention is:

1. A magnetic recording and reproducing system, comprising: a rotatable cylinder adapted to receive a magnetic tape therearound over a circumferential angle of approximately 180° to 220°, a magnetic head fixedly mounted on said cylinder, driving means for drivingly rotating said cylinder, means for turning on and turning off said driving means, a cleaning mechanism for cleaning said magnetic head, said cleaning mechanism being disposed outside said circumferential angle where said magnetic head is out of contact with a magnetic tape wound around said cylinder, said cleaning mechanism comprising: a cleaning pad, and means for pressing said cleaning pad against said magnetic head only during an inertial rotation period of said cylinder after said driving means for rotating said cylinder has been turned off so said cylinder rotates under its own inertia.

2. A system according to claim 1, wherein said cleaning mechanism comprises a lever, said cleaning pad being held by said lever, a spring for biasing said lever away from said cylinder, and a plunger for moving said lever against the bias of said spring against said cylinder.

3. A system according to claim 1, wherein said driving means includes means for rotating said cylinder forward and backward, and wherein said pressing means presses said cleaning pad against said magnetic head only during an inertial rotation period after said means for turning off said driving means has turned off said driving means and said cylinder rotates backwards, under its own inertia.

4. A magnetic recording and reproducing system as claimed in claim 1, wherein said cleaning pad is made of a close-textured, nap-free powder absorbing material.

5. A magnetic recording and reproducing system as claimed in claim 1, wherein said cleaning pad is a plate.

6. A magnetic recording and reproducing system as claimed in claim 1, wherein said cleaning pad is an endless loop.

* * * * *